April 17, 1951 R. E. EKSTROM 2,548,960
LIQUID LEVEL GAUGE

Filed Oct. 24, 1945 3 Sheets-Sheet 1

Inventor
Robert E. Ekstrom
BY
Davis, Lindsey, Smith & Shonts
Attorneys.

April 17, 1951  R. E. EKSTROM  2,548,960
LIQUID LEVEL GAUGE

Filed Oct. 24, 1945  3 Sheets—Sheet 2

Inventor
Robert E. Ekstrom
BY
Davis, Lindsey, Smith & Shonts
Attorneys.

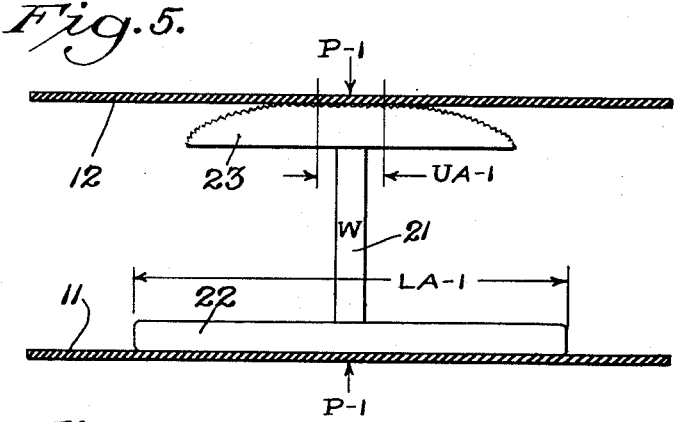
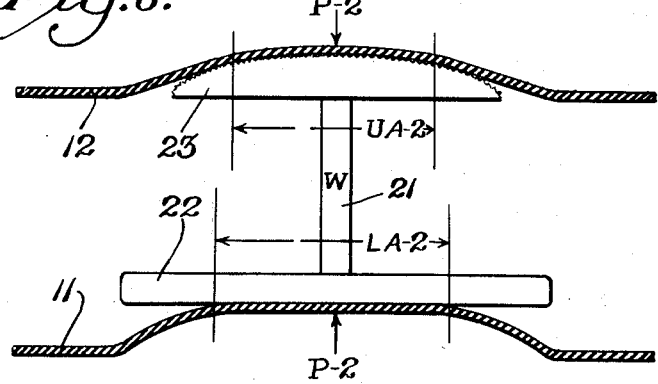
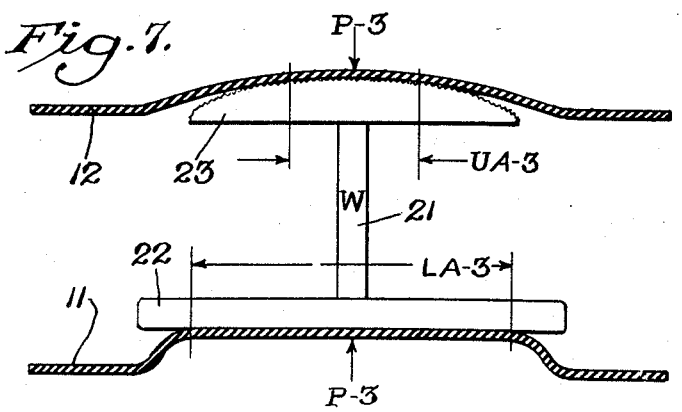

Patented Apr. 17, 1951

2,548,960

UNITED STATES PATENT OFFICE 2,548,960

LIQUID LEVEL GAUGE

Robert E. Ekstrom, Chicago, Ill., assignor to Elematic Equipment Corporation, Chicago, Ill., a corporation of Illinois Application October 24, 1945, Serial No. 624,224

10 Claims. (Cl. 73—301)

The invention relates generally to gauges for determining conditions of a liquid within a tank and more particularly to a gauge for indicating the level of such liquid.

The general object of the invention is to provide a novel liquid level gauge which provides an accurate indication of the level of the liquid, which is highly responsive to change in level, and which is of relatively simple but rugged construction.

Another important object is to provide a novel liquid level gauge which is adapted for use where the liquid in the tank is under a wide variation of pressure ranging from atmospheric up to pressures many times that value.

Still another object is to provide a novel liquid level gauge utilizing diaphragm means subjected to the pressures due to varying levels of liquid within the tank, with an indicator actuating means having a movable element actuated by the diaphragm.

A further object is to provide a novel liquid level gauge utilizing a flexible diaphragm as a pressure responsive member for actuating a movable element, the diaphragm being anchored at its periphery and bearing centrally against the movable element without being connected thereto, whereby the portion of the diaphragm subject to flexure is imperforate to avoid chance of rupture.

A further object is to provide a novel liquid level gauge having a member responsive to the pressure due solely to the height of the liquid in the tank, which member is adapted to actuate means for varying the characteristics of an electric current whereby such variations may be indicated by an instrument remote from the tank.

Still another object is to provide a novel liquid level gauge comprising a pressure responsive member and means for varying the characteristics of an electric current, said means being actuated by said member but being separate therefrom and constructed as a unit so that it may be independently mounted to facilitate assembly and servicing of the gauge.

Other objects and advantages will become apparent from the following description taken in connection with the accompanying drawings, in which:

Figs. 5, 6 and 7 are diagrammatic views illustrating the action of the diaphragm means under varying pressures due to the level of liquid in the tank.

Figure 1:
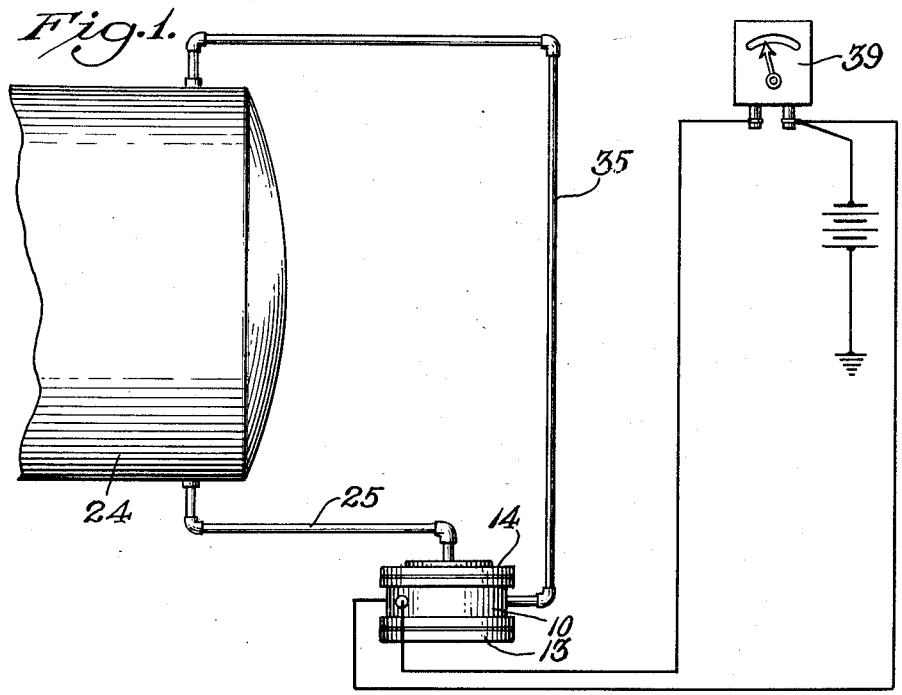
Figure 1 is a diagrammatic view of a liquid level gauge embodying the features of the invention and showing the manner in which it may be connected to a tank for indicating the level of liquid therein, and to an instrument for indicating the variation in liquid level.
Figure 2:
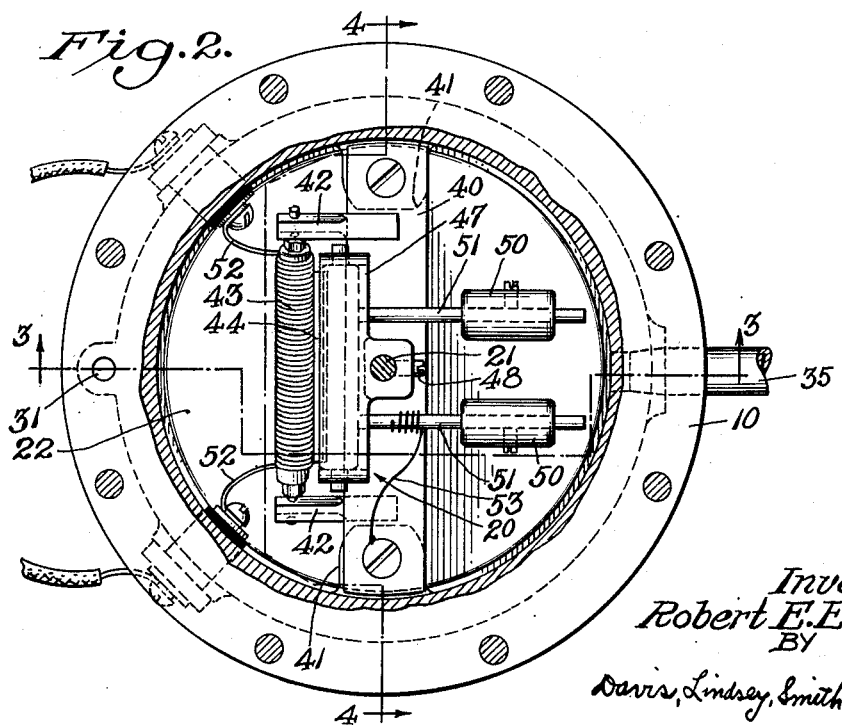
Fig. 2 is a top plan view of the liquid level gauge with portions of the casing structure broken away to show the interior thereof.

Many liquid level gauges heretofore used employed an elastic member such as a spring to resist movement of an indicating element caused by pressures due to varying levels of liquid in a tank. A gauge of such character obviously requires high accuracy in the spring in order to give true readings of the level. Moreover, if the gauge is so constructed as to be highly sensitive to slight changes in level, the indicating element tends to have a fluttering action which, when dampened, tends to cause an inaccuracy in reading. Other gauges have been constructed in which the spring is eliminated, but heretofore such gauges have been complicated in character and are not sufficiently rugged in construction to meet general operating conditions.

The present gauge is both simple and rugged in construction and, at the same time, eliminates the necessity of using any spring or other elastic member. Generally described, the gauge herein disclosed comprises diaphragm means subjected to the pressure due to the level of liquid in the tank. The diaphragm means bears against a weighted vertically movable element of an indicator actuating means, with the area of contact of the diaphragm means with said element varying inversely with variations in the pressure, so that movement of said element varies with the variations in pressure. The movement of said element thus does not depend upon the elasticity of the diaphragm but is controlled solely by the pressure due to the level of liquid. For this reason, the present gauge, when properly calibrated, gives inherently accurate indications of the liquid level.

In the embodiment of the invention illustrated in the drawings, I provide a hollow body 10 preferably of cylindrical form open at its upper and lower ends. Extending across the open ends of the body 10 are diaphragms 11 and 12 which are clamped in place by caps 13 and 14. The diaphragms 11 and 12 are preferably made of rubber reinforced with fabric, although the specific material utilized, so long as it has sufficient strength and flexibility, does not affect the operability of the gauge. In the specific form shown, the upper opening of the body member 10 is made slightly smaller in diameter, by means of a flange 15, than the lower opening, and consequently the available area of the upper diaphragm 12 is smaller than the available area of the lower diaphgram 11. Such relationship of the available areas of the two diaphragms, however, is not essential to the invention.

Figure 3:
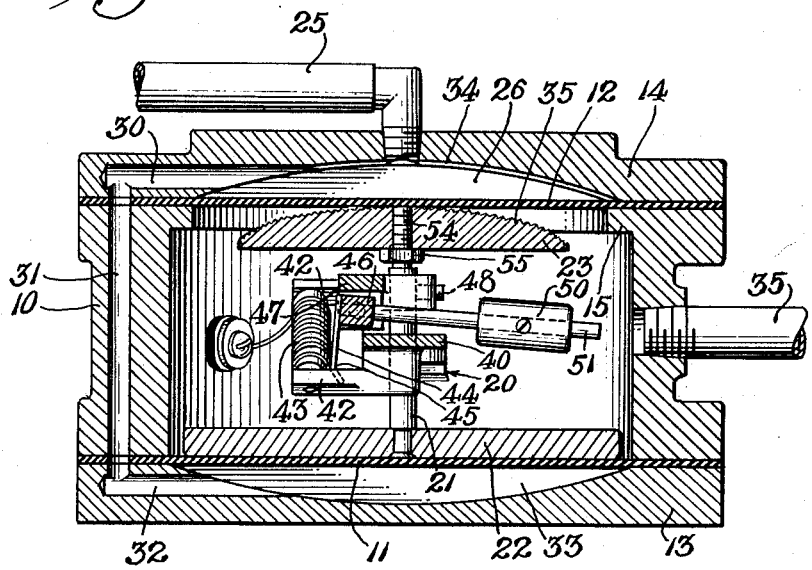
Fig. 3 is a vertical sectional view taken on the line 3—3 of Fig. 2.

Mounted in the body member 10 between the two diaphragms is a means, indicated generally at 20 (see Figs. 3 and 4), for actuating an indicator, which means includes a movable element 21 herein comprising a rod provided with a weight 22 at its lower end and a weight 23 at its upper end, the two weights bearing against the respective diaphragms. Preferably the upper weight 23 has a rounded upper surface, and the lower weight 22 has a flat lower surface, but each of these surfaces may be either flat or rounded.

Figure 4:
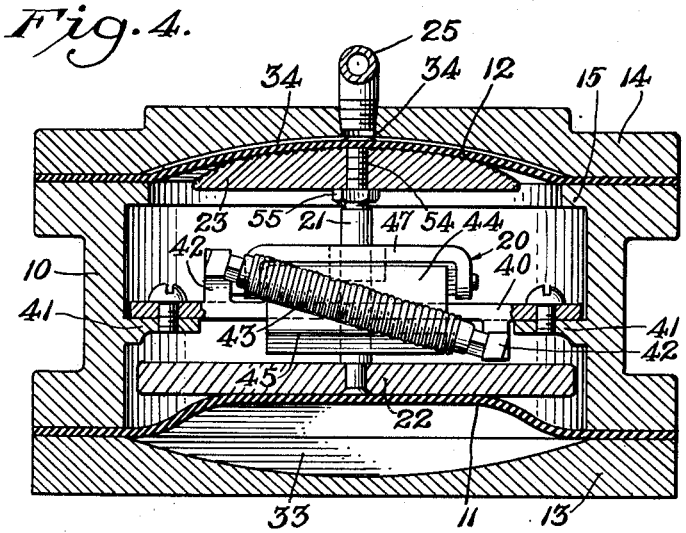
Fig. 4 is a vertical sectional view taken on the line 4—4 of Fig. 2.

The diaphragms 11 and 12 are adapted to be subjected to the pressure due to the level of liquid in a tank 24 (see Fig. 1), and to this end a pipe 25 connects the bottom of the tank with a chamber 26 formed in the upper cap 14. To subject the lower diaphragm 11 to the same pressure, the upper cap 14 is provided with a radial passage 30 communicating with a vertical passage 31 provided in the body 10, and the vertical passage 31 similarly connects with a radial passage 32 in the lower cap 13, the radial passage 32 extending from a pressure chamber 33 provided in the lower diaphragm. Thus, both cap 13, as will be evident, may be subjected to the pressure of the liquid at the bottom of the tank. However, the passages 30, 31 and 32 are preferably relatively small so that pressure entering the gauge through the pipe 25 first tends to depress the upper diaphragm 12 and then eventually to raise the lower diaphragm 11. To prevent liquid being sealed within the chambers 33 and 26 when the pressure is relieved after the parts have assumed their extreme upward position as shown in Fig. 4, the upper cap 14 may be provided with radial grooves 34 in spider-like form to relieve such pressure. Similarly, the upper surface of the upper weight 23 is preferably roughened as at 35 to prevent any sealing action occurring.

From the foregoing, it will be apparent that the liquid in the tank 24 is permitted to enter the gauge to actuate the diaphragms. However, because of the position of such diaphragms, none of the liquid enters the interior of the body 10 where the indicator actuator means 20 is located.

If the tank 24 is of the type wherein the liquid is under a pressure, the pressure at the bottom of the tank, of course, would be equal to the pressure to which the liquid in the tank is subjected plus the pressure due to the height of the liquid therein. In order that the gauge member may give an accurate reading of the liquid level, means is provided to subject the inner faces of each diaphragm to the pressure in the tank. Thus, a pipe 35 is provided, which connects the top of the tank with the interior of the body 10, and the pressure on the liquid in the tank is thus transmitted to the diaphragms. It is obvious, therefore, that the pressure tending to flex the diaphragms is due solely to the level of liquid within the tank. If the tank is under atmospheric pressure, the pipe 35 may be disconnected, if desired, and the interior of the body 10 opened to the atmosphere.

To describe the theory of operation of the gauge, the force exerted by each diaphragm on the movable element 21 is equal to the pressure due to the level of liquid times the area of contact of the diaphragm with its adjacent weight. Thus, for any pressure due to the level of liquid, the force exerted by the upper diaphragm 12 on the weight 23 is equal to the pressure per unit area times the area of contact of the diaphragm 12 with the weight 23. The force exerted by the lower diaphragm 11 is equal to the pressure times the area of contact of the diaphragm 11 with the weight 22. The force exerted by the upper diaphragm is obviously downward, while the force exerted by the lower diaphragm is upward. A third force tending to move the element 21 downwardly is the force of gravity due to the weights 22 and 23, plus the weight of the rod 21. For any given level of liquid in the tank, the movable element 21 will come to rest as a result of the forces acting thereon becoming balanced. Thus, letting P equal the unit pressure for any level of liquid, UA representing the area of contact of the upper diaphragm 12 with the weight 23, LA the area of contact of the lower diaphragm 11 with the weight 22, and W the total weight of the two weights 22 and 23 as well as the rod 21, then the following equation may be set up for any level of liquid in the tank:

$$P \times LA = P \times UA + W$$

This equation may be rearranged as follows:

$$P(LA - UA) = W$$

From the preceding equation, it is apparent that with increases in pressure due to increases in height of the liquid in the tank, the difference between the two areas of contact of the diaphragms with their respective weights decreases, since W is a constant. Therefore, with increases in such pressure the lower area of contact (LA) decreases while the upper area of contact (UA) increases.

It is obvious that the areas of contact change only with movement of the movable element. Thus, the extent of movement of said element varies with the pressure or, in other words, with the level of liquid in the tank. The extent of movement of the element 21, when properly calibrated, therefore is a measure of the pressure or level of the liquid in the tank.

To illustrate the foregoing, various positions of the diaphragms and weights are shown in Figs. 5, 6 and 7. Thus, in Fig. 5 I have illustrated the position of the parts when the tank 24 is empty. With such a condition, there is, of course, some pressure applied to the diaphragms since the gauge is shown as being positioned below the tank. Such pressure is a fixed amount and is due to the difference in height between the bottom of the tank and the gauge.

The pressure under such condition may be designated as P—1. In the preferred arrangement of the parts, both diaphragms are held in a substantially flat condition by the pressure P—1. Since the movable element 21 reaches a balanced condition and since P—1 is relatively small, the area of contact of the lower diaphragm (LA—1) is substantially larger than the area of contact of the upper diaphragm (UA—1).

Fig. 6 illustrates diagrammatically the conditions occurring when the tank is full. In this instance, P—2 is the pressure due to the height of liquid in the tank (plus, of course, the pressure due to the difference in height between the gauge and the bottom of the tank). Since P—2 is substantially greater than P—1, the lower area of contact (LA—2) becomes smaller due to the flexing of the diaphragm while the upper area of contact (UA—2) correspondingly becomes larger. It is, of course, obvious that the lower area of contact is always greater than the upper area of contact for any depth of liquid in the tank, since the weight W is acting downwardly.

Fig. 7 illustrates an intermediate point for the height of liquid in the tank with a pressure P—3 corresponding thereto. The lower area of contact (LA—3) in this instance is substantially greater than the upper area of contact (UA—3), but the difference between the two is not as great as under the conditions shown in Fig. 5.

From the foregoing, it will be apparent that the movable element 21 of the indicator actuating means 20 is moved solely by the forces resulting from the pressure due to varying levels of liquid in the tank. The flexing of the diaphragms and the mutually opposite action thereof together with the downward action of the weight W varies the extent of flexure of the diaphragms and, consequently, the position of the movable element 21. The action of the gauge may be considered as embodying the idea of applying pressure upwardly to a diaphragm (diaphragm 11) to move the movable element 21 upwardly, and then reducing the effect of the pressure on the diaphragm 11 by a compensating pressure on the top diaphragm and by the weight W. In whatever way the action is explained, it is evident that the movable element 21 is actuated through the pressure due to the level of the liquid in the tank and does not utilize any elastic or resilient member such as a spring to control the movement thereof. Highly accurate results are, therefore, obtainable by this gauge.

The indicator actuating means 20 may be of any desired form and, in this instance, is shown as electrical in character, utilizing the idea of varying the resistance in a circuit to actuate the needle of an indicating instrument, shown at 39. To this end, the mechanism 29 comprises a bracket 40 extending crosswise within the body 10 and rigidly secured, as by screws, to lugs 41 cast integrally with the body 10. The bracket 40 is provided with a pair of spaced arms 42, one extending upwardly and the other extending downwardly. Mounted on the arms 42 is a resistance coil 43 which thus has a slanting position.

Coacting with the resistance coil 43 is a contact plate 44 having a ridge 45 formed therein for engaging the side face of the coil 43. With the coil 43 slanted as illustrated, the ridge 45 extends horizontally. The plate 44 is carried on a support 46 (see Fig. 3) pivotally carried by a U-shaped member 47 secured, as by a setscrew 48, to the rod 21. The ridge 45 on the plate 44 is held firmly in engagement with the coil 43 by weights 50 mounted on rods 51 extending from the pivotal support 46. The weights 50 may be adjusted along the rods 51 to provide for the desired pressure between the plate 44 and the coil 43. By utilizing weights to hold the contact plate 44 in engagement with the coil 43, the resilience of the plate 44 is not relied upon to effect the desired electrical contact. The same action could be accomplished by positioning the coil 43 horizontally and forming the ridge 45 in the plate 44 at a slant.

From the foregoing, it will be apparent that movement of the rod 21 effects vertical movement of the plate 44, and the point at which the ridge 45 engages the coil 43 will thus move along the coil to vary the resistance in the circuit in which the coil is included. Thus, movement of the element 21 under varying pressures due to the level of liquid in the tank effects a change in the electrical characteristics of an electrical circuit by varying the resistance therein.

The electrical circuit may be of any desired character and, in the present instance, is a three-wire potentiometer hookup with the variable center tap grounded. Thus, the two ends of the coil 43 are provided with connections 52 leading through insulated binding posts provided in the wall of the body 10, while the plate 44 is grounded through the gauge, connecting piping and tank, a wire 53 preferably being provided within the gauge to connect one of the weight-supporting rods 51 with one of the screws securing the bracket 40 to a lug 41 to insure effecting a good ground.

To insure a proper relationship between the various parts of the device, various adjustments have been provided. Thus, the U-shaped supporting member for the plate 44 may be adjusted on the rod 21 by loosening the setscrew 48 to raise or lower the supporting member 47, as desired. The upper weight 23 is adjustable on the rod 21 by being threaded thereon as indicated at 54, a locknut 55 being provided to hold the weight firmly in its adjusted position.

It will be noted that the indicator actuating means 20 is constructed as a unit mounted in the body 10 independently of the diaphragms 11 and 12. The diaphragms, while bearing against the weights 22 and 23, are unattached thereto. Consequently, the portion of each diaphragm subject to flexure is imperforate and chance of rupture thereof is thereby avoided.

In the arrangement illustrated in Fig. 1 of the drawings, the gauge is shown as being positioned below the bottom of the tank 24. However, if it is inconvenient to so position the gauge, it may be mounted at any level above the bottom of the tank. In such case, the pipe 25 is connected so that it first extends downwardly from the tank for a short distance and then laterally and upwardly so that air may be trapped in the upwardly extending portion. Variations in the level of liquid in the tank will then cause variations in the trapped air to actuate the diaphragms in the gauge.

I claim:

1. A liquid level gauge comprising a pair of diaphragms positioned in spaced relation, means mounted in the space between said diaphragms for actuating an indicator including a movable element bearing at opposite ends against said diaphragms with varying effective areas for actuation thereby but being unattached thereto, means for subjecting the outer faces of said diaphragms to the pressure at the bottom of a tank, and means for subjecting the space between said diaphragms to the pressure at the top of the tank.

2. A liquid level gauge comprising a pair of diaphragms positioned generally horizontally in spaced relation, means mounted in the space between said diaphragms for actuating an indicator including a vertically movable element provided with weights at its upper and lower ends unattached to but bearing against said diaphragms, one of said weights having a substantially flat surface for contacting one of said diaphragms and the other of said weights having a rounded surface for contacting the other of said diaphragms whereby said element is actuated as a result of varying areas of contact between the weights and the corresponding diaphragms, and means for subjecting the outer faces of said diaphragms to the pressure due to the level of liquid in a tank.

3. A liquid level gauge comprising means for actuating an indicator including a movable element, a pair of diaphragms mounted on opposite sides of said element for moving said element, means constituting a pressure chamber on the outer side of each of said diaphragms, means for applying the pressure due to the level of liquid in a tank to the pressure chamber adjacent one of said diaphragms, and means constituting a passage connecting said pressure chambers whereby said pressure first tends to flex said one diaphragm to move said movable element in one direction and thereafter by flexure of the other diaphragm to move said movable element in the opposite direction, the effective areas of said diaphragms acting on said element varying with said pressure.

4. A liquid level gauge comprising means for actuating an indicator including a vertically movable element, a weight carried by said element, a pair of diaphragms mounted above and below said element for moving said element, means providing a pressure chamber above the upper diaphragm, a pressure chamber below the lower diaphragm, means connected to a tank for applying the pressure due to the level of liquid in the tank to the upper pressure chamber, and means providing a passage connecting said pressure chambers, whereby said pressure first tends to flex the upper diaphragm downwardly and together with said weight to move said element downwardly and thereafter by flexure of the lower diaphragm to move said element upwardly, the effective areas of said diaphragms acting to move said element varying with said pressure.

5. A liquid level gauge comprising a hollow body member open at opposite ends, an indicator actuating unit mounted in said body member including a movable element extending toward the open ends of the body member, said movable element having a substantially flat contact surface at one of its ends and having a rounded contact surface at its opposite end, a pair of caps for closing the open ends of the body member, and a pair of diaphragms clamped between said caps and the ends of the body member and bearing against the contact surfaces at the opposite ends of said movable element with varying effective areas, said caps having connections providing for application to both diaphragms of the pressure due to the level of liquid in a tank.

6. A liquid level gauge comprising a hollow body member having a pair of lugs located within its interior, said member having openings at its ends, an indicator actuating unit mounted within said body member and secured to said lugs, said unit having a movable element extending toward and centrally of said openings, said movable element having a substantially flat contact surface at one of its ends and having a rounded contact surface at its opposite end, a pair of caps for closing said openings, and a pair of diaphragms clamped between said caps and said body member and extending across said openings, said diaphragms bearing against the contact surfaces at the opposite ends of said movable element with varying effective areas and said caps having connections for applying the pressure due to the level of liquid in a tank to both diaphragms.

7. A liquid level gauge comprising a hollow body member open at opposite ends, an indicator actuating unit secured in said body member and having a movable element extending toward said open ends, a pair of caps secured to the open ends of said body member, a pair of diaphragms clamped between said caps and said body member and bearing oppositely against said element with varying effective areas, said caps being hollowed to provide pressure chambers for the respective diaphragms, said caps and said body member having a passage connecting said pressure chambers, and means for connecting the pressure chamber for one diaphragm to a tank to subject the diaphragms to the pressure due to the level of liquid therein.

8. A liquid level gauge comprising a hollow body member open at opposite ends, an indicator actuating unit secured in said body member and having a movable element extending toward said open ends, a pair of diaphragms bearing against said movable element with varying effective areas and closing said open ends, a pair of caps secured to said body member externally of said diaphragms and providing pressure chambers adjacent thereto, said body member and said caps being provided with a passage interconnecting said pressure chambers, a pipe connecting the pressure chamber adjacent one diaphragm to the bottom of a tank, and a pipe connecting the interior of the body member to the top of the tank.

9. A liquid level gauge comprising a hollow body member open at opposite ends, an indicator actuating unit secured in said body member and having a movable element extending toward said open ends, a pair of diaphragms bearing against said movable element with varying effective areas and closing said open ends, a pair of caps secured to the ends of the body member externally of said diaphragms and hollowed out to provide pressure chambers adjacent the diaphragms, means connected centrally to the cap adjacent one diaphragm to apply the pressure due to the level of liquid in a tank to said diaphragm, said caps having radial passages and said body member having a longitudinal passage interconnecting said pressure chambers, and the cap adjacent said one diaphragm having a radial groove extending from said means to the radial passage in said cap to prevent closure of said passage by the diaphragm.

10. A liquid level gauge comprising means for actuating an indicator and having a vertically movable element including a weight, said movable element having a substantially flat contact surface at one of its ends and having a rounded contact surface at its opposite end, and a pair of diaphragms both responsive to the pressure due to the level of liquid in a tank, one of said diaphragms bearing downwardly on said element at one of said contact surfaces and the other bearing upwardly on said element at the other of said contact surfaces, said element being moved by flexure of said diaphragms due to variations in said pressure to vary the bearing areas of both of said diaphragms.

ROBERT E. EKSTROM.

REFERENCES CITED

The following references are of record in the file of this patent:

UNITED STATES PATENTS

| Number | Name | Date |
|---|---|---|
| 668,514 | Garrels et al. | Feb. 19, 1901 |
| 1,499,384 | Lee | July 1, 1924 |
| 1,624,659 | Eynon | Apr. 12, 1927 |
| 1,669,460 | Galdi et al. | May 15, 1928 |
| 1,909,545 | Knoblock | May 16, 1933 |
| 1,953,819 | Payne | Apr. 3, 1934 |
| 1,969,784 | Ebright | Aug. 14, 1934 |
| 1,981,354 | Goerg | Nov. 20, 1934 |
| 2,256,473 | De Giers | Sept. 23, 1941 |